United States Patent Office 2,791,488
Patented May 7, 1957

2,791,488

ANHYDROUS MONOCALCIUM PHOSPHATE

Russell N. Bell, Chicago Heights, and Lowell E. Netherton, Park Forest, Ill., assignors to Victor Chemical Works, a corporation of Illinois No Drawing. Application August 24, 1954,
Serial No. 451,964

5 Claims. (Cl. 23—109)

This invention relates to an improved anhydrous monocalcium phosphate, and more particularly to such a material having a slower rate of hydration, increased resistance to caking, improved flow characteristics and an improved rate of reaction.

The use of anhydrous monocalcium phosphate as a baking acid, particularly in the ready-mixed baking field, is the subject of Patents 2,160,232, 2,160,233, 2,160,700, 2,160,701 and 2,462,104. All of these patents are aimed at the production of anhydrous monocalcium phosphate (hereinafter referred to as AMCP), which is resistant to hydration in a humid atmosphere, which will not cake, and which will remain free-flowing. However, the resistance to hydration is the main problem which has confronted this particular material.

Various additives have been suggested for the purpose of increasing the free-flowing characteristics of the material as, for example, magnesium carbonate, chalk, tricalcium phosphate, and lime.

We have found that the improved calcium polyphosphate of submicroscopic crystal size and containing not more than 8 molecules of water of hydration, and of low bulk density, as described in our copending application, Serial No. 451,302, filed August 20, 1954, has remarkable and unexpected properties when added to anhydrous monocalcium phosphate, and particularly the autogenously-coated anhydrous monocalcium phosphate described in Knox et al. Patent No. 2,462,104 and the related products described in Patents 2,160,700 and 2,160,701. These heat-treated anhydrous monocalcium phosphates have a glassy coating of unknown composition which has the remarkable property of permitting ready reaction with water, but resisting reaction with water vapor, even at fairly high humidities.

The addition of the calcium polyphosphate to the AMCP is entirely different than previous conditioners which had little, if any, beneficial effect on reaction rate or stability and, in some cases, actually were detrimental in this respect.

Furthermore, previous conditioners which might produce free-flowing characteristics were not necessarily satisfactory in preventing caking. The calcium polyphosphate not only improves stability and produces free-flowing characteristics, but also does overcome the caking problem. No previous conditioner improves stability against hydration, rate of reaction, resistance to caking and free-flowing qualities.

When a calcium polyphosphate is added to AMCP, the resulting product possesses a stability, as measured by its rate of hydration, which is superior to unconditioned AMCP or AMCP which has been conditioned with the conditioners known in the art. We also find that the free-flowing characteristics of AMCP treated with calcium polyphosphate are equal to or actually superior to those of AMCP treated with the various conditioners known in the art. In addition, we find that a small amount of calcium polyphosphate added to AMCP produces a composition which is much more resistant to caking in the presence of atmospheric moisture, and finally, we find that calcium polyphosphate added to AMCP gives a product with a baking powder rate of reaction, as described hereinafter, which is at least equal and in many cases superior to that of prior art material.

As used in the following specification and claims, coated anhydrous monocalcium phosphate is intended to mean the well-known article of commerce consisting of finely divided particles having a thin, autogenous, glassy, substantially complete, relatively insoluble coating as described in U. S. Patent 2,160,232. It is also intended to include products containing primary and secondary impurities in the coating as described in U. S. Patent No. 2,462,104. This definition is not to be limiting, however, and other crystals of anhydrous monocalcium phosphate are intended to be included within the scope of the above definition.

It has already been pointed out that the calcium polyphosphate used as a conditioner in accordance with this invention consists of exceedingly fine submicroscopic crystals and has a bulk density of the order of 5 pounds per cubic foot. The polyphosphate must be prepared under carefully controlled conditions as set forth in our copending application, Serial No. 451,302, filed August 20, 1954. The calcium polyphosphate has the formula $(CaO)_m(P_2O_5)_n \cdot xH_2O$ wherein the ratio of $m$ to $n$ lies between approximately 1.66 and 2.00 and $x$ is from 0 to approximately 8. The process by which this product is made is extremely important. The preferred product for use in this invention is made by adding with constant agitation a 5 to 15% solution of an alkali metal tripolyphosphate to a 2 to 10% solution of a soluble calcium salt at 50–100° C., adjusting the pH of the resulting slurry to approximately 7 to 10, filtering immediately, and drying the resulting product. This product is normally in the form of an octahydrate when dried at room temperature, but may be dehydrated to the tetrahydrate at approximately 110° C. and to the anhydrous salt at aproximately 420° C. These various hydrates are all suitable for the object of this invention.

The term conditioner as used herein is intended to have the usual meaning known in the art. In addition, it is intended that the definition include the action which is sometimes referred to as "stabilizing." Thus although the primary action of these calcium polyphosphates appears to be one of conditioning, it is also apparent that there is an accompanying stabilizing action in some cases.

The following data show the excellent results obtained when AMCP is conditioned with a calcium polyphosphate.

A. RESISTANCE TO HYDRATION

These tests were conducted by placing approximately 10 g. samples of AMCP in petri dishes and exposing to a high temperature and humidity in a humidity cabinet for a period of seven days. The samples were weighed daily and the increase in weight was used to determine the percentage of the material which had become hydrated. Visual observation of the caking tendencies were also made as noted. (It was already known that ¾% tricalcium phosphate and 1% calcium silicate produced the optimum results obtainable with those two well-known conditioners.)

Table I

OPTIMUM AMOUNT OF CALCIUM POLYPHOSPHATE (CPP) CONDITIONER AT 81% RELATIVE HUMIDITY (RH) 95° F. FIGURES SHOW THE PERCENT OF HYDRATED MATERIAL PRESENT

| Time of exposure | Uncond. AMCP | AMCP+ 0.5% CPP | AMCP+ 0.75% CPP | AMCP+ 1.0% CPP | AMCP+ 1.5% CPP |
|---|---|---|---|---|---|
| 1 day | 11.3 | 15.3 | 9.4 | 8.1 | 9.5 |
| 2 days | 38.0 | 43.5 | 31.3 | 27.7 | 34.4 |
| 3 days | 47.4 | 58.5 | 43.8 | 40.6 | 43.7 |
| 4 days | 58.0 | 70.7 | 55.0 | 59.6 | 59.4 |
| 5 days | 70.7 | 79.6 | 64.6 | 73.9 | 72.5 |
| 6 days | 83.4 | 86.7 | 74.5 | 82.5 | 81.8 |
| 7 days | 95.2 | 93.0 | 85.6 | 90.7 | 91.2 |

These data show that under these severe humidity conditions 0.75% CPP produces a marked improvement in the resistance of AMCP to hydration. It also is evident that all four levels of addition give some degree of protection. For most of the following comparative tests either the ¾% or 1% level is used.

Table II

COMPARISON OF RELATIVE RATES OF HYDRATION BETWEEN CPP AND OTHER COMMERCIALLY USED CONDITIONERS AT 75% RH AND 95° F.

| Time of Exposure | Uncond. AMCP | AMCP+ 0.75% TCP[1] | AMCP+ 1% CS[2] | AMCP+ 0.75% CPP | AMCP+ 1.0% CPP |
|---|---|---|---|---|---|
| 1 day | 4.34 | 3.49 | 2.65 | 3.35 | 2.51 |
| 2 days | 9.39 | 5.24 | 4.29 | 5.49 | 4.25 |
| 5 days | 27.6 | 21.5 | 19.4 | 21.0 | 18.4 |
| 6 days | 31.4 | 25.4 | 23.4 | 24.4 | 21.9 |
| 7 days | 35.8 | 30.3 | 28.8 | 28.7 | 26.4 |

[1] Tricalcium phosphate.
[2] Calicium silicate.

These data show that 0.75% CPP is better than 0.75% TCP and approximately equal to 1% CS, but that 1.0% CPP is definitely improved over either of the commercially known conditioners at their respective optimum levels.

Table III

COMPARISON SIMILAR TO TABLE II BUT AT 81% RH AND 95° F.

| Time of Exposure | Uncond. AMCP | AMCP+ 0.75% TCP | AMCP+ 1.0% CS | AMCP+ 0.75% CPP | AMCP+ 1.0% CPP |
|---|---|---|---|---|---|
| 1 day | 6.09 | 4.17 | 3.95 | 4.61 | 3.77 |
| 2 days | 18.5 | 11.6 | 12.7 | 14.3 | 10.0 |
| 5 days | 53.7 | 46.8 | 44.8 | 40.5 | 51.0 |
| 6 days | 62.7 | 56.4 | 53.2 | 48.5 | 60.7 |
| 7 days | 71.7 | 68.2 | 63.4 | 61.5 | 69.8 |
| Caking results | badly caked | caked | caked hard | slight caking | caked |

Under these more severe humidity conditions, the 0.75% CPP conditioner proved superior to any of the other combinations. It should be particularly noted also that the 1% CS conditioner which most closely approaches 0.75% CPP in resisting hydration was caked hard. This test illustrates the difference between rate of hydration and caking. Although calcium silicate and calcium polyphosphate appear nearly equal when tested only on the basis of rate of hydration, the calcium silicate is wholly unsatisfactory because it causes the AMCP to cake hard.

B. RATE OF REACTION

The term "rate of reaction" as used herein may also be referred to as the 2–10 minute rate. It is defined as the difference between the primary and secondary rate of reaction. The term "primary rate of reaction" means the amount of $CO_2$ generated in the first two minutes by reaction of the material in a water medium with sodium bicarbonate at 27° C. with a standard quantity of bicarbonate capable of liberating 200 cc. of $CO_2$. The secondary rate is the amount of $CO_2$ generated in the succeeding eight minutes. Generally speaking, a high 2–10 minute rate is desirable since it indicates that most of the $CO_2$ generating power of the AMCP has carried through the primary rate period, which corresponds to the mixing period in a dough, and is available to leaven the dough after mixing. The following data thus compare only the 2–10 minute rate:

Table IV

COMPARISON OF AMCP.—SODIUM BICARBONATE BAKING POWDERS EXPOSED TO AN ATMOSPHERE CONTAINING 75% RH AT 102° F.

| Days Exposure | Uncond. AMCP | AMCP+ 0.75% TCP | AMCP+ 0.75% CPP | AMCP+ 1.0% CPP | AMCP+ 1.25% CPP |
|---|---|---|---|---|---|
| None | 137 | 133 | 140 | 141 | 135 |
| 1 | 50 | 90 | 94 | 106 | 103 |
| 3 | 39 | 73 | 80 | 85 | 86 |
| 5 | 22 | 63 | 62 | 79 | 79 |

Similar tests at 60% RH gave similar results except that the 0.75% and 1.0% levels of CPP were best and the 1.25% CPP was approximately equal to 0.75% TCP.

It is preferred not to use less than $\frac{1}{10}$ nor more than 5% of the calcium polyphosphate, and as will be observed from the given tables, the preferred range is from about .75 to about 1.25%.

The foregoing detailed description has been given for clearness of understanding only and no unnecessary limitations should be understood therefrom as modifications will be obvious to those skilled in the art.

We claim:

1. Finely divided coated anhydrous monocalcium phosphate particles to which have been added a minor proportion of a calcium polyphosphate having the formula $(CaO)m(P_2O_5)n \cdot xH_2O$ wherein the molal ratio of $m$ to $n$ lies between approximately 1.66 and 2.00 to 1 and $x$ is from 0 to approximately 8 and which is produced by adding with constant agitation a 5 to 15% solution of an alkali metal tripolyphosphate to a 2–10% solution of a soluble calcium salt at 50–100° C., adjusting the pH of the resulting slurry to approximately 7 to 10, filtering immediately and drying the resulting product.

2. Heat-treated, autogenously-coated, anhydrous monocalcium phosphate particles stabilized by the addition of a small proportion of calcium polyphosphate having submicroscopic crystal size and having the formula $$(CaO)m(P_2O_5)n \cdot xH_2O$$

wherein the molal ratio of $m$ to $n$ lies between approximately 1.66 and 2.00 to 1 and $x$ is from 0 to approximately 8 and which is produced by adding with constant agitation a 5% to 15% solution of an alkali metal tripolyphosphate to a 2–10% solution of a soluble calcium salt at 50–100° C., adjusting the pH of the resulting slurry to approximately 7 to 10, filtering immediately and drying the resulting product.

3. A product as set forth in claim 2 in which the proportion of calcium polyphosphate is from 0.1% to 5%.

4. A product as set forth in claim 2 in which the proportion of calcium polyphosphate is from 0.75% to 1.25%.

5. Finely divided coated anhydrous monocalcium phosphate particles to which have been added a minor proportion of a calcium polyphosphate having the formula $(CaO)m(P_2O_5)n \cdot xH_2O$ wherein the molal ratio of $m$ to $n$ lies between approximately 1.66 and 1.67 to 1 and $x$ is from 0 to approximately 8 and which is produced by adding with constant agitation a 5% to 15% solution of an alkali metal tripolyphosphate to a 2–10% solution of a soluble calcium salt at 50–100° C., adjusting the pH of the resulting slurry to approximately 7 to 10, filtering immediately and drying the resulting product.

References Cited in the file of this patent

UNITED STATES PATENTS

| | | |
|---|---|---|
| 2,160,232 | Schlaeger | May 30, 1939 |
| 2,173,826 | Curtis | Sept. 26, 1939 |
| 2,263,487 | Cox et al. | Nov. 18, 1941 |
| 2,291,608 | Cobbs | Aug. 4, 1942 |
| 2,631,102 | Hubbard et al. | Mar. 10, 1953 |